United States Patent [19]

Klatt

[11] Patent Number: 4,631,679

[45] Date of Patent: Dec. 23, 1986

[54] GEARSHIFT SELECTION SYSTEM FOR A POWER-ASSISTED TRANSMISSION

[75] Inventor: Alfred Klatt, Wathlingen, Fed. Rep. of Germany

[73] Assignee: WABCO Westinghouse Fahrzeugbremsen GmbH, Hanover, Fed. Rep. of Germany

[21] Appl. No.: 535,484

[22] Filed: Sep. 26, 1983

[30] Foreign Application Priority Data

Oct. 9, 1982 [DE] Fed. Rep. of Germany ....... 3237509

[51] Int. Cl.[4] .......................... G05G 5/04; F16H 57/06; F16H 5/80
[52] U.S. Cl. .................................. 364/424.1; 74/475; 74/752 D; 74/859
[58] Field of Search ................ 74/365, 475, 859, 861, 74/866; 364/424.1

[56] References Cited

U.S. PATENT DOCUMENTS

| | | | |
|---|---|---|---|
| 3,937,105 | 2/1976 | Arai et al. | 74/866 X |
| 4,026,169 | 5/1977 | Kühnle et al. | 74/861 |
| 4,150,416 | 4/1979 | Heppenstall et al. | 74/365 |
| 4,253,346 | 3/1981 | Kühnle et al. | 74/866 X |
| 4,361,060 | 11/1982 | Smyth | 74/866 |
| 4,425,620 | 1/1984 | Batcheller et al. | 364/424.1 |
| 4,507,736 | 3/1985 | Klatt | 364/424.1 |

FOREIGN PATENT DOCUMENTS

| | | | |
|---|---|---|---|
| 96352 | 12/1983 | European Pat. Off. | 364/424.1 |
| 3032403 | 4/1982 | Fed. Rep. of Germany | 364/424.1 |

*Primary Examiner*—Felix D. Gruber
*Attorney, Agent, or Firm*—J. B. Sotak

[57] ABSTRACT

A vehicle gearshift mechanism for a power-assisted transmission with a unilateral gearshift actuator which can be moved into speed selection positions and into a neutral position. The gearshift only has one speed selection position for a shift-up or shift-down, respectively. A respective optimum gear is assigned to the speed selection positions by an electronic evaluation control circuit. The evaluation control circuit receives signals representing the speed and the respective driving conditions of the vehicle to shift to the optimum gear.

5 Claims, 4 Drawing Figures

GEARSHIFT SELECTION SYSTEM FOR A POWER-ASSISTED TRANSMISSION

FIELD OF THE INVENTION

This invention relates to a gearshift selection system for a power-assisted transmission and, more particularly, to a gearshift arrangement for controlling the speed of a motor-driven transmission by selecting the appropriate gear in accordance with prevailing driving conditions at the time that the gearshift lever is shifted to cause a change in the gears.

BACKGROUND OF THE INVENTION

There are several well-known versions of gearshift mechanisms for motor vehicle transmissions. The most common type is the so-called H-gearshift configuration which is capable of controlling four forward speeds in passenger cars and four to sixteen forward speeds in commercial vehicles. However, there is a disadvantage in an H-gearshift in that it is sometimes difficult to find a certain gear. This is especially true in commercial vehicles which have a relatively large number of speeds where one or more gears can be easily skipped or missed.

There is also another known gearshift which is the so-called linear transmission which is shown and disclosed in my copending U.S. application, Ser. No. 348,038 now U.S. Pat. No. 4,507,736, issued on Mar. 26, 1985. In this latter-mentioned gearshift arrangement, the gears are selected by moving the gearshift lever along a straight path in one plane. In such a linear gearshift, it is sometimes difficult to find a certain speed, particularly in transmissions having many gears, since the individual gear positions are very close to each other. This makes the operation of the vehicle difficult since the driver, in many cases, has to look at the gearshift lever when he is shifting gears.

OBJECTS AND SUMMARY OF THE INVENTION

Accordingly, it is an object of this invention to provide a unique gearshift mechanism which can be easily and quickly shifted through a great number of speeds without distracting the driver.

Another object of this invention is to provide a new and improved gearshift selection system for a vehicular transmission which simply requires a single forward or rearward movement of the gearshift lever for causing an upward or downward change of the gears.

An essential point of the present invention is that it is no longer necessary to assign a fixed position of a gearshift lever for each speed of the gearshift, but rather, there is one position of a shifting command generator which corresponds to the shift commands to shift-up and to shift-down, respectively.

In accordance with the present invention, there is provided a vehicle gearshift selection system for a power-assisted transmission comprising, a unilateral gearshift actuator which is shiftable by a driver, a gear sensor for sensing the position of the unilateral gearshift actuator, and an evaluation control circuit for receiving a shift command signal from the gear sensor and for evaluating the prevailing driving conditions of the vehicle and for causing a shift-up or shift-down into the proper gear of the transmission when the unilateral gearshift actuator is shifted by the driver.

DESCRIPTION OF THE DRAWINGS

The above objects and other attendant features and advantages of the present invention will become more readily apparent when considered in conjunction with the detailed description and the accompanying drawings, wherein.

DETAILED DESCRIPTION OF THE INVENTION

Figure 1:
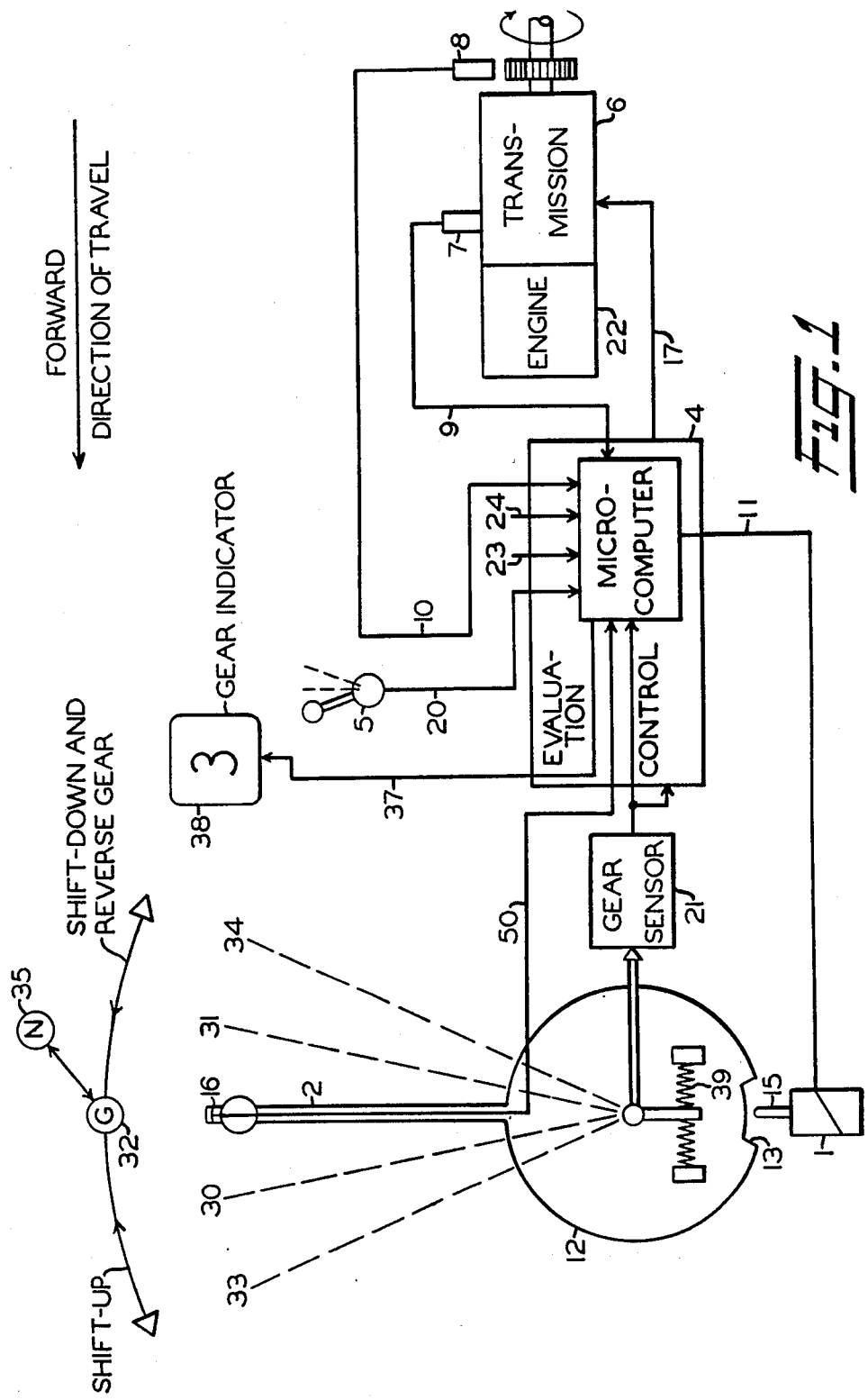
FIG. 1 illustrates a gearshift selection system having a gearshift lever which may be shifted in both a forward and rearward direction to cause a shift-up and shift-down of the gears of a power-assisted transmission.

Referring to the drawings, and in particular to FIG. 1, there is shown an internal combustion motor 22 which is flange-connected to an automatic power-assisted transmission 6. An electronic evaluation control circuit 4 receives an input feedback signal from a magnetic-type of speed sensor 8 via a lead 10 which represents the output speed or r.p.m. of the transmission 6. A second sensor 7 monitors the gear position of the transmission and conveys a feedback signal to the evaluation control circuit 4 via a lead 9. Further, leads 23 and 24 transmit feedback signals to the evaluation control circuit 4 in accordance with the load of the vehicle and the position of the accelerator or gas pedal or the governor rod distance at the fuel-injection pump, respectively. Furthermore, a driving program selector 5 conveys a signal to the evaluation control circuit 4 via a lead 20. The selector 5 is arranged to select various driving programs, such as, "steady speed" or "economical", "city" or "cross-country". A speed sensor 21 monitors and senses the respective position of gearshift lever or actuator 2 and supplies an input signal to the evaluation control circuit 4.

From the received input data, the evaluation control circuit 4 calculates and computes an optimum operating gear in accordance with the selected driving mode program. Upon manipulation of the gearshift lever 2 in the direction of travel to the selected speed position 30 (shift-up) or opposite to the direction of travel to the selected speed position 31 (shift-down), the optimum gear selection signal is conveyed to the transmission from evaluation control circuit 4 via lead 17. This signal will result in a shift to a higher or lower gear which is engaged with a power-assisting mechanism.

The main criteria for the calculation of the new gear is based upon the output speed of the transmission or vehicle speed, the position of the gas pedal, and the load carried by the vehicle. The engine speed is readily computed from the information of sensors 8 and 7. The exact circuitry and mode of operation of the evaluation control circuit 4, which contains a microcomputer, is not a subject of the invention and therefore is not explained in more detail.

An additional output lead 37 is connected to the evaluation control circuit 4 for controlling a display gear indicator 38. The indicator displays the gear which has just been put into and/or the optimum proposed gear which is signaled by the evaluation control circuit 4. It is also possible to signal engine overspeeds and malfunctions within the electronic or mechanical portions of the gearshift, for example by means of a warning light (not shown).

A further output lead 11 is connected to the evaluation control circuit 4 which serves to control a latching or stopping device 1. The latching device 1 has a magnetically-actuated stop pin 15 which cooperates with latching or stopping a notch or recess 13 formed on a gearshift plate 12 which is attached to the gearshift lever 2.

The gearshift lever 2 has a center position 32 (G) which is automatically resumed after a shifting movement. A biasing spring 39 returns the gearshift lever 2 to its center position 32 (G) after the gearshift lever is released by the operator of the vehicle. In order to shift to neutral, the gearshift lever 2 can be moved from the center position 32 (G) into a neutral position 35 (N) by pushing at a right angle to the direction of the shifting movement.

In describing the function and mode of operation of the gearshift selection system, it will be assumed that the gearshift lever 2 and selector 5 are in the positions shown in FIG. 1 of the drawing, and that the vehicle is moving in the direction shown by the arrow. Now, if the driver wants to shift into a higher gear, he simply pushes the gearshift lever 2 forward or in the direction of travel initially to the speed selection position 30. Thereupon, the evaluation control circuit 4 computes and determines from the data available concerning the prevailing driving condition, the most suitable next highest gear. In the case shown, the next appropriate higher gear can be the fourth gear or even the fifth gear. Thus, an output signal is then communicated to the transmission 6 via lead 17 which causes engagement of the power-assisting mechanism. As soon as the shift in gears is completed, the evaluation control circuit 4 causes the locking device 1 to be released. That is, a signal is developed on lead 11 which causes the withdrawal of the stop pin 15 from notch 13 to unlock the gearshift lever 2. Accordingly, it is now possible to push the gearshift lever 2 all the way forward to the end position 33. In so doing, the driver is informed, without being distracted from traffic, that the requested gear has been engaged and that the engine can be re-engaged. The driver may now let go or release the gearshift lever 2. The gearshift lever 2 is returned to the center position 32 (G) by the biasing force of tension spring 39. The function and purpose of the appraisal of the completion of a gear change is disclosed in U.S. Pat. No. 4,380,177.

A corresponding shifting method and procedure applies for the shifting down into a lower gear. To accomplish this, the gearshift lever 2 is pulled rearwardly or moved opposite to the direction of travel to a gear selection position 31. After the gear shifting is completed, the gearshift lever 2 is moved into an end position 34. Again, the spring 39 serves the purpose of centering the gearshift lever 2 in the center position 32 (G) after the gearshift lever is released by the driver.

In the event that during the shift-down into the gear selection position 31, the vehicle speed is zero, or near zero, the evaluation control circuit 4 automatically causes the engagement of the reverse gear. The shifting into the reverse gear can be avoided or inhibited, under certain conditions, to first gear or neutral.

If a stopped vehicle is shifted up from a neutral position or from reverse gear, the transmission is shifted automatically into first gear when the vehicle is loaded or climbing a hill, or into second gear when the vehicle is unloaded or descending a hill.

As shown, the gearshift lever 2 is provided with a key-operated switch 16 which can be operated by the driver and which is connected to the evaluation control circuit 4 by a lead 50. Thus, the optimum gear selection operation of the evaluation control circuit 4 can be rendered inoperative by actuating the key switch 16. Accordingly, the evaluation control circuit 4 is only capable of shifting one gear up or down.

In the gear selecting positions 30 and 31, the evaluation control circuit 4 checks, prior to executing the shifting command, whether the maximum allowable speed of the engine 22 is exceeded. If the maximum allowable engine speed is exceeded, the shifting does not take place and the existing speed is retained. A warning signal may alert the driver of this condition.

In order to ensure that the gear cylinders are working properly within the transmission 6, the evaluation control circuit 4 further suppresses any reshifting for at least one second after a speed change has occurred.

Figure 2:
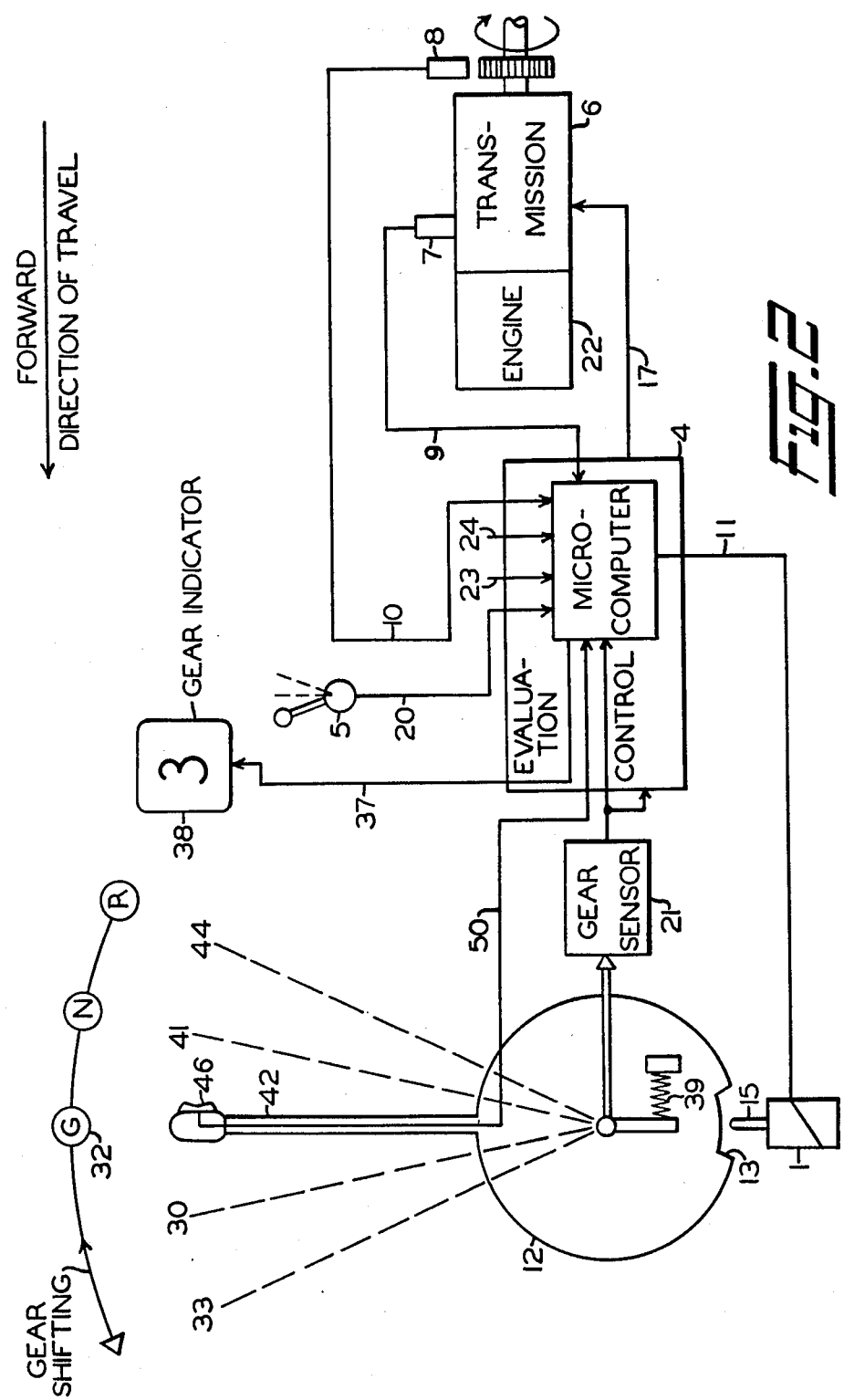
FIG. 2 illustrates another gearshift selection system having a gearshift lever which may be shifted in a unilateral direction to cause a shift-up and shift-down of the gears of a power-assisted transmission.

Referring now to FIG. 2, there is illustrated another embodiment of the gearshift selection system in accordance with the present invention in which a gearshift lever or actuator 42 only has to be moved in a unilateral or forward direction, namely, in the direction of travel, for causing the proper shifting of the gears.

To shift up or shift down, the gearshift lever 42 is initially moved from a center position 32 (G) to a speed selection position 30. The evaluation control circuit 4 is programmed to automatically shift up or shift down to the optimum gear in accordance with the driving conditions. As soon as the appropriate gear has been engaged, the evaluation control circuit 4 causes the magnetic latch 1 to withdraw the stop pin 15 from slot 13 so the gearshift lever 42 can be further moved, as described above, until it reaches the end position 33. After release, the gearshift lever 42 is returned by the tension spring 39 to the center position 32 (G).

Figure 3:
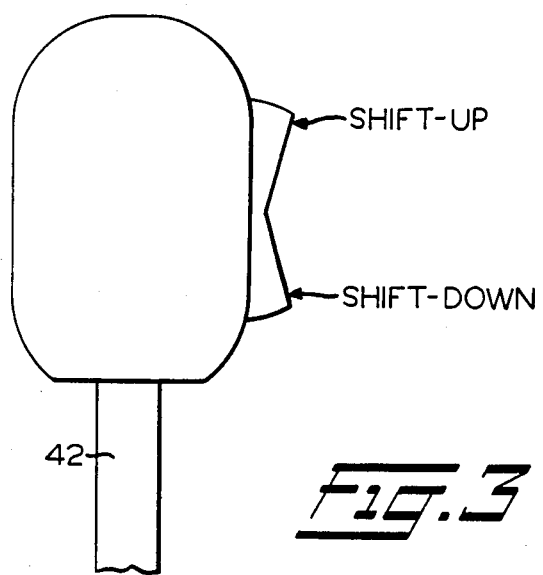
FIG. 3 shows an enlarged view of the gearshift lever of FIG. 2.

In certain situations, particularly under extreme driving conditions, it is advantageous to command or directly inform the evaluation control circuit 4 whether it should shift up or shift down. Under these circumstances, the driver simply has to operate a toggle switch 46 mounted on the top of the gearshift lever 42, as shown in FIG. 3. Thus, the transmission 6 is only shifted up or shifted down in one-gear increments.

An advantage of the automatic arrangement, which only requires a "shifting command" and where it is up to the evaluation control circuit 4 to determine whether to shift up or down, lies in the fact that the driver is relieved of another decision-making judgment under normal driving situations. However, if at the time of climbing a hill, the evaluation control circuit 4 shifts down into a "wrong" gear, it is possible to take corrective action by simultaneously operating the toggle switch 46.

It will be seen that in order to assume a neutral position 41 (N), the centered gearshift lever 42 is simply moved backward in opposition to the direction of travel. The evaluation control circuit 4 senses the neutral position and unlocks the magnetic stop 1 so that the gearshift lever 42 can be moved further back into position 44 into reverse gear (R).

The remaining elements and the function of the gearshift selection system of FIG. 2 are substantially the same as that of FIG. 1.

Figure 4:
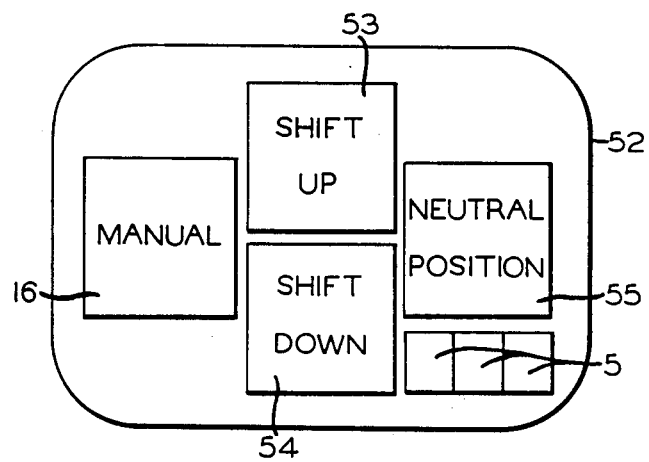
FIG. 4 shows an embodiment of a gearshift arrangement in which keyboard pushbutton keys are employed in place of a gearshift lever.

Referring now to FIG. 4, there is shown a modified version of the gearshift arrangement in which keyboard pushbutton keys 52 replace the gearshift lever 2. The keyboard gearshift actuator 52 is located in the same position which was normally occupied by the gearshift lever 2. In order to enable the driver to reliably operate the keyboard gearshift 52 in the dark, it is advisable to employ large and handy unilaterally-depressible keys which can be readily felt without direct visual contact.

The function of shifting gears remains the same as described above. When the shift-up pushbutton key 53 is depressed, the transmission 6 shifts into the next higher optimum gear. Conversely, when the shift-down pushbutton key 54 is depressed, the transmission 6 shifts into an optimum lower gear. When the manual pushbutton key 16 is depressed, the function of optimum gear selection is suppressed and only one gear at a time is capable of being shifted in each direction. When the push-button key 55 is depressed, the transmission 6 is moved into the neutral position. The reverse gear is engageable if the transmission is in either first gear or neutral, as described in FIG. 1, by depressing pushbutton key 54.

It will be seen that the depression of one of the three pushbutton keys 5 allows the driver to select the correct driving program, as previously described.

In order to accomplish the function of speed acknowledgment with the shifting command keyboard 52, the keys 53 and 54 for shift-up and shift-down are designed in such a manner that the initial depression only results in a partial downward movement and the keys may be depressed further after the new gear has been successfully engaged. In this manner, the driver receives information in the same way as with gearshift levers 2, 42 of the completed gear shift. An acknowledgment of this type is less distracting to the driver than an acoustical or optical signal.

It is apparent that the keyboard 52 may also assume a different form than the one shown in FIG. 4.

Further, the keyboard 52 may be mounted at any point easily accessible to the driver, for example, it may be installed directly on the steering wheel.

As a further step toward a fully automatic system, the shift command 2, 42 or 52 may additionally produce a signal for disengaging the clutch (not shown). Accordingly, the re-engagement of the clutch may also be controlled by the evaluation control circuit 4.

The above-described semiautomatic gearshift mechanism makes possible a very simple shifting of the transmission without overly distracting the driver from traffic. Further, even untrained drivers are able to easily operate the system. Compared to a fully automatic system, the present system has the advantage that the wishes of the driver are taken into consideration.

Another advantage is that the gearshift selection system can be used for different types of vehicles having a different number of gear positions. This results in a reduction of production cost. Thus, a driver may operate different vehicles without having to be retrained.

Further, since the driver cannot select any wrong gear, it is possible to lower the maximum allowable engine speed. This results in increased life or conservation of engine and transmission.

Finally, the gearshift selection system, according to the invention, makes possible economical driving methods, since the evaluation control circuit always determines and indicates the optimum gear and engages same, respectively.

It will be understood that various alterations and changes may be made by those skilled in the art without departing from the spirit and scope of the subject invention. Therefore, it will be appreciated that all modifications, ramifications, and equivalents will be readily comprehended by skilled artisans, and thus it is understood that the invention is not limited to the exact embodiments but is to be accorded the full scope and protection of the appended claims.

Having thus described my invention what I claim as new and desire to secure by Letters Patent, is:

1. A vehicle gearshift selection system for a power-assisted transmission comprising, a unilateral gearshift actuator is capable of being shifted by a driver to cause a gear change of the transmission, a gear sensor for sensing the position of said unilateral gearshift actuator, and an evaluation control circuit for receiving a gearshift command signal from said gear sensor and for receiving input signals representing the gas pedal position, the vehicle speed and the load carried by the vehicle for calculating and computing an optimum new gear and for allowing a shift-up or shift-down into the optimum new gear of the transmission when said unilateral gearshift actuator is shifted to an initial speed selection position by the driver and for permitting said unilateral gear shift actuator to be shifted beyond said initial speed selection position when the optimum new gear is engaged by causing a stop pin to be withdrawn from a notch of a locking device.

2. The vehicle gearshift selection system, as defined in claim 1, wherein a switch is operated by the driver to inhibit the selection through the evaluation control circuit of the proper speed and causes the shift-up or shift-down of only one gear at a time.

3. The vehicle gearshift selection system, as defined in claim 1, wherein said unilateral gearshift actuator includes one key for a shift-up and one key for a shift-down.

4. The vehicle gearshift selection system, as defined in claim 3, wherein said keys for shift-up and for shift-down can initially be depressed part way and after acknowledgment of the proper gear shift, can be depressed further.

5. The vehicle gearshift selection system, as defined in claim 4, wherein said unilateral gearshift aetuator includes an additional key to disconnect the optimum gear selection and another key to connect to a neutral position.

* * * * *

UNITED STATES PATENT AND TRADEMARK OFFICE
CERTIFICATE OF CORRECTION

PATENT NO. : 4,631,679
DATED : December 23, 1986
INVENTOR(S) : Alfred Klatt

It is certified that error appears in the above-identified patent and that said Letters Patent are hereby corrected as shown below:

Column 6, claim 5, line 56, delete "aetuator" and insert --actuator--

Signed and Sealed this

Twenty-ninth Day of September, 1987

Attest:

DONALD J. QUIGG

Attesting Officer     Commissioner of Patents and Trademarks